United States Patent [19]

Tabata

[11] Patent Number: 4,675,943
[45] Date of Patent: Jun. 30, 1987

[54] POULTRY TRANSFER APPARATUS

[75] Inventor: Koichi Tabata, Isehara, Japan

[73] Assignee: Gordon Johnson Japan Co., Ltd., Isehara, Japan

[21] Appl. No.: 855,382

[22] Filed: Apr. 24, 1986

[30] Foreign Application Priority Data

Apr. 28, 1985 [JP] Japan .................................. 60-91685

[51] Int. Cl.⁴ ............................................. A22C 21/00
[52] U.S. Cl. ............................................ 17/11; 17/24; 198/680
[58] Field of Search ....................... 17/11, 24; 198/680, 198/477, 480

[56] References Cited

U.S. PATENT DOCUMENTS

| | | | |
|---|---|---|---|
| 3,006,453 | 10/1961 | Tonelli | 198/680 X |
| 3,643,293 | 2/1972 | Rejsa et al. | 17/11 |
| 4,178,659 | 12/1979 | Simonds | 198/680 X |
| 4,570,295 | 2/1986 | Van Mil | 17/11 |
| 4,597,133 | 7/1986 | Van de Nieuwelaar | 17/11 X |

Primary Examiner—Willie G. Abercrombie
Attorney, Agent, or Firm—Leonard Bloom

[57] ABSTRACT

The apparatus according to the present invention includes a rotatable leg-holding wheel for holding the legs of the bird. Said leg-holding wheel is mounted close to both the terminal portion of the defeathering line and the initial portion of the eviscerating line and operates to cause the birds to transfer from the defeathering line onto the eviscerating line. On the frame for the leg-holding wheel are fixedly mounted an engaging guide member for guiding the bird suspended from the defeathering shackle and for causing it to engage the leg-holding notches of the leg-holding wheel, a cutter for cutting the ankles of the bird engaged by the leg-holding notches to release the bird from the defeathering shackle, and an inclining guide member and a releasing guide member which coact to release the bird held in the leg-holding notches and cause it to engage with the eviscerating shackle.

1 Claim, 11 Drawing Figures

POULTRY TRANSFER APPARATUS

BACKGROUND OF THE INVENTION

1. Field of the Invention

This invention relates to an apparatus for transferring defeathered birds suspended from the defeathering shackles on the defeathering line onto the eviscerating shackles on the eviscerating line in a poultry processing system having the defeathering line for removing the feathers of birds and the eviscerating line for removing the entrails of birds.

2. Description of the Prior Art

One of the conventional transfer devices is disclosed in Japanese Laid-Open Patent Application No. 216642/1983. This device utilizes a transfer conveyor consisting of endless belts respectively arranged adjacent the defeathering line and the eviscerating line for transferring the birds from the former to the latter line. This transfer conveyor includes endless belts having means comprising plate-like members having a plurality of slots to hold the legs of suspended birds and ejector means arranged at the point where the transfer conveyor and the eviscerating line come closest to each other for releasing the birds from the hanging means and allowing them to be received by the eviscerating line.

As a result, such conventional device requires a large space for installation of the transfer conveyor, which presents a considerable obstacle for making compact the entire bird processing system. Furthermore the hanging means on the transfer conveyor and the ejector required make the entire system too complicated and render its manufacture too time-consuming. Worse still, the lubricant oil for the endless belts may be transferred to the bird body via the hanging means, thereby presenting a serious problem from the viewpoint of food sanitation. Additionally since the ejector strongly presses the bird body, it may damage the skin or entrails of the birds, causing problems in the subsequent steps of the process.

SUMMARY OF THE INVENTION

In view of the afore-mentioned disadvantages of the conventional technology, it is an object of this invention to provide an apparatus which will minimize the space required for its installation and thereby reduce the size of the entire processing system. It is another object of this invention to provide a transfer apparatus which is simple in construction and easy to manufacture. It is still another object of this invention to provide a transfer apparatus which is free of problems from the viewpoint of food sanitation and which will facilitate the operation in the subsequent steps of the poultry processing.

In order to eliminate said disadvantages of the conventional technology, the apparatus according to the present invention includes a rotatable leg-holding wheel for holding the legs of the bird. Said leg-holding wheel is mounted close to both the terminal portion of the defeathering line and the initial portion of the eviscerating line and operates to cause the birds to transfer from the defeathering line onto the eviscerating line. On the frame for the leg-holding wheel are fixedly mounted an engaging guide member for guiding the bird suspended from the defeathering shackle and for causing it to engage the leg-holding notches of the leg-holding wheel, a cutter for cutting the ankles of the bird engaged by the leg-holding notches to release the bird from the defeathering shackle, and an inclining guide member and a releasing guide member which coact to release the bird held in the leg-holding notches and cause it to engage with the eviscerating shackle.

As the defeathering shackle travels and the leg-holding wheel rotates, the bird suspended from the defeathering shackle is guided by the engaging guide member and is eventually engaged by the leg-holding notches on the leg-holding wheel. During such engagement the ankles of the bird are cut with the cutter to release the bird from the defeathering shackle and the bird is then received and held only by the leg-holding wheel. As the leg-holding wheel further rotates and the eviscerating shackle moves on, the bird held in the leg-holding wheel is guided by the inclining guide member and the releasing guide member and removed from the leg-holding notches for engagement with the eviscerating shackle located therebelow. Such operation is repeated and the birds suspended from defeathering shackles are accurately transferred onto the eviscerating shackles.

BRIEF DESCRIPTION OF THE FIGURES

The above description, as well as the objects, features, and advantages of the present invention will be more fully appreciated by reference to the following detailed description of the presently preferred, but nonetheless illustrative, embodiment in accordance with the present invention taken in conjunction with the accompanying drawings wherein:

FIG. 7 further shows the arrangement of respective guide members and retainer members;

DESCRIPTION OF THE PREFERRED EMBODIMENT

One embodiment of this invention is described below in detail in reference to the accompanying drawings.

Figure 4:
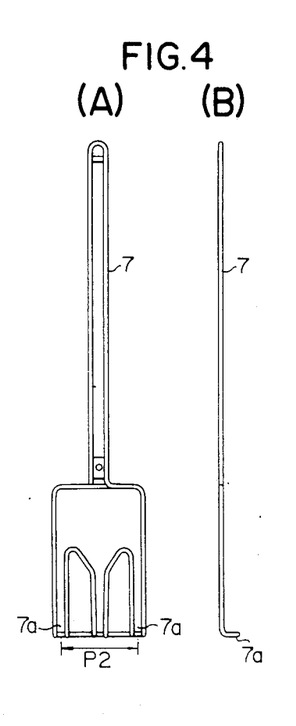
FIG. 4 shows the defeathering shackle, wherein (A) is a front view and (B) is a right side view of the shackle.

The defeathering line 1 for removal of the feathers of the bird A basically consists of a first overhead conveyor 3 which moves in an endless manner on a first tubular rail 2 mounted on the ceiling. The first overhead conveyor 3 is formed by numerous yokes 5 arranged on a chain 6 at equal intervals. Each of the yokes has two rollers 4 engageable with said first rail 2. Said yokes 5 move together along the first rail 2 on said interposed rollers 4 as the chain 6 is moved. At the lower end portion 5a of each yoke 5 is mounted a defeathering shackle 7 from which the bird A is suspended by its ankles Aa. Thus from said first overhead conveyor 3 are suspended numerous defeathering shackles 7 at equal intervals P1. Any known shackle can be used as the defeathering shackle. As shown in FIG. 4, the defeathering shackle 7 has an appropriate length and engaging sections 7a, 7a formed at appropriate intervals P2 for engaging both ankles Aa of the bird A. The bird A is hung by its ankles Aa angaged by the engaging sections 7a and the bird A is defeathered while hanging from said defeathering shackle 7 by its ankles Aa.

Figure 5:
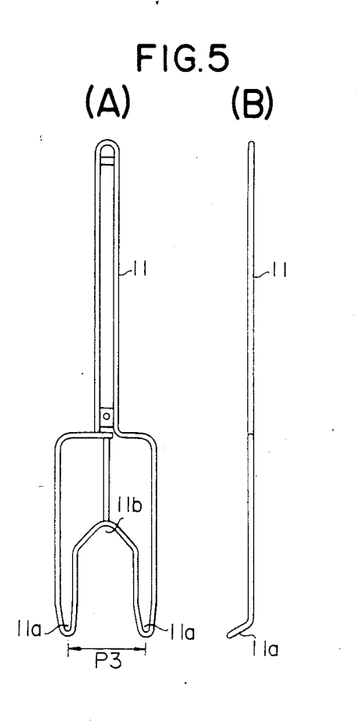
FIG. 5 shows the eviscerating shackle, wherein (A) is a front view and (B) is a right side view of the shackle.

The eviscerating line 8 for removing the entrails of the bird A basically includes like in the case of said defeathering line 1, a second overhead conveyor 10 movable on a second tubular rail 9 arranged in an endless manner. This second rail 9 is located below the first rail 2 of said defeathering line 1 and in alignment or in parallel with said defeathering line 1. As in the case of the first overhead conveyor 3 shown in FIG. 3, said second overhead conveyor 10 is composed of yokes 5 connected at equal intervals by the chain 6. Each yoke 5 has two rollers 4 engageable with said second rail 9. Said yokes 5 move together along said second rail 9 on the rollers 4 as said chain 6 is moved. At the lower end portion 5a of each of said yokes 5, the eviscerating shackle 11 for engaging the portions of legs Ab above their knee joints is mounted and hangs down from it. Thus it will be seen that like said first overhead conveyor 3 the second overhead conveyor 10 carries numerous eviscerating shackles 11 hanging therefrom at equal intervals P1. This eviscerating shackle 11 is well-known. As shown in FIG. 5, it has an appropriate length, at the lower end of which are formed engaging sections 11a, 11a. These engaging sections 11a have an interval P3 therebetween which is the same as the interval P2 between the engaging sections 7a of said defeathering shackle 7 and engage the legs Ab of the bird A and hold the bird A in a hanging state. The bird A is eviscerated while held in said eviscerating shackle 11 by its legs Ab.

The terminal portion 1a of said defeathering line 1 and the initial portion 8a of said eviscerating line 8 are located close to each other where a frame 15 composed of a vertical frame member 12, horizontal frame member 13 and reinforcement frame member 14 is provided. At the midpoint of the frame 15 is rotatably provided a rotary shaft 20 supported in the upper bearing 18 and the lower bearing 19 mounted between an upper horizontal bar 16 and a lower horizontal bar 17. The rotary shaft 20 has mounted thereon a wheel 21 for the defeathering line for rotation in engagement with the first overhead conveyor 3 moving along said first rail 2 at said terminal portion 1a of said defeathering line 1, a wheel 22 for the eviscerating line for rotation in engagement with the second overhead conveyor 10 movable along said second rail 9 at the initial portion 8a of said eviscerating line 8, and a leg-holding wheel 24 (FIG. 7) having leg-holding notches 23 formed at equal intervals along its outer periphery 24a for holding the portions of the legs Ab of the bird A higher than their knee joints. These three wheels are rotatably mounted on the rotary shaft 20 in the order above mentioned from its top portion down to its bottom portion.

Said wheel 21 for the defeathering line is fixedly mounted on the rotary shaft 20 via a bushing 25 fitted at the center of the wheel 21 and is rotatable with said rotary shaft 20.

Said wheel 22 for the eviscerating line has substantially the same diameter as that of said wheel 21 for the defeathering line and is rotatably mounted on said rotary shaft 20 via a bushing 26 fitted at the center of the wheel 22 for the eviscerating line below said wheel 21 for the defeathering line such that the outer periphery 22a of the wheel 22 is engageable with said second overhead conveyor 10. The wheel 22 for the eviscerating line is positioned on the rotary shaft 20 by a sleeve 27 of appropriate length fixed to the rotary shaft 20. Namely the lower surface of the bushing 26 fitted at the center of said wheel 22 is rotatably supported on the upper surface of said sleeve 27 and consequently said wheel 22 for the eviscerating line is freely rotatable independently of said sleeve 27 and, in turn, of said rotary shaft 20. A stopper member 28 fixed on the underside of said wheel 22 for the eviscerating line is engageable with a hook member 29 fixed on the outer periphery of the top of said sleeve 27 and extending centrifugally therefrom. By virtue of such engagement of said stopper member 28 with said hook member 29, the wheel 22 for the eviscerating line and the wheel 21 for the defeathering line are rotatable on the rotary shaft 20 at an identical speed. An adjustable pin (not shown) is provided at the upper end of said hook member 29. This adjustable pin extends perpendicularly to the axis of the hook member 29 in the horizontal plane and its length is made freely adjustable so that the relative circumferential position between said wheel 21 for the defeathering line and said wheel 22 for the eviscerating line can be adjusted. A spacer 30 is provided between said bushings 25 and 26 to prevent the upward movement of said wheel 22 for the eviscerating line.

The leg-holding wheel 24 has a somewhat larger diameter than the diameter of said wheel 21 or 22 and is rotatably mounted on said rotary shaft 20 by a bushing 31 fitted at its center. The leg-holding wheel 24 is held in place by an adjustable spacer 32 disposed between said bushing 31 and said lower bearing 19 with its lower end fixed to said rotary shaft 20 with a suitable stopper ring (not shown). In other words, the lower surface of the bushing 31 of said leg-holding wheel 24 is rotatably supported on the upper surface of said adjustable spacer 32. Thus, the leg-holding wheel 24 is freely rotatable on said rotary shaft 20 independently of the rotation of said spacer 32 and said rotary shaft 20. Said leg-holding wheel 24 is positioned on the rotary shaft 20 such that there is an appropriate space between the lower end of said defeathering shackle 7 suspended from said first overhead conveyor 3 and the upper surface of said leg-holding wheel 24 and the bifurcating portion 11b of said eviscerating shackle 11 suspended from said second overhead conveyor 10 is substantially at the same level as the upper surface of the leg-holding wheel 24 with said engaging sections 11a extending lower than the leg-holding wheel 24. Said position of the leg-holding wheel 24 is adjustable by said adjustable spacer 32.

A stopper member 33 vertically mounted on the upper surface of said leg-holding wheel 24 is engageable with a hook member 34 fixed on the outer surface of the lower portion of said sleeve 27 and extending centrifugally therefrom so that by this engagement between said members 33 and 34, the leg-holding wheel 24 can be rotated on the rotary shaft 20 synchronously with said wheel 21 for the defeathering line and said wheel 22 for the eviscerating line. That is, all of said three wheels 21, 22 and 24 are rotated synchronously and at the same speed.

As in the case of the hook member 29 on said wheel 22 for the eviscerating line, an adjustable pin (not shown) is provided on the forward end of said hook member 34, thereby to adjust the circumferential position of said leg-holding wheel 24 relative to said wheel 21 for the defeathering line and to said wheel 22 for the eviscerating line. A suitable spacer 35 is provided between the upper-surface of the bushing 31 of said leg-holding wheel 24 and the lower surface of said sleeve 27 so as to prevent the upward movement of said leg-holding wheel 24.

Figure 7:
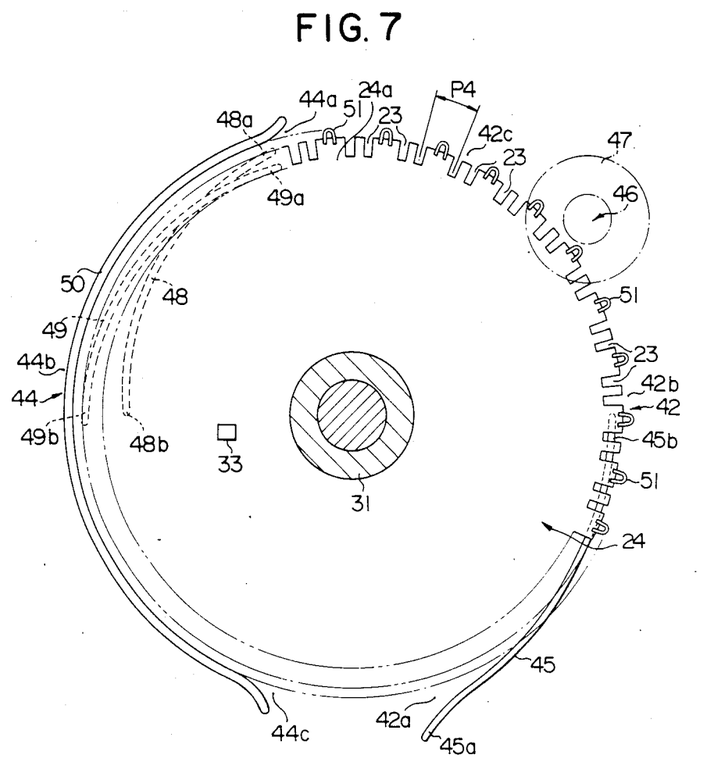
FIG. 7 is an enlarged plan view of the leg-holding wheel, with part of the leg-holding notches and positioning members omitted.

As shown in FIG. 7, each pair of leg-holding notches 23 formed along the outer periphery 24a of said leg-holding wheel 24 has substantially the same interval P4 between respective notches as the interval P2 between the engaging sections 7a of said defeathering shackle 7 and the interval P3 between the engaging sections 11a of said eviscerating shackle 11. Numerous pairs of such leg-holding notches 23 are formed along said outer periphery 24a at equal intervals.

Figure 6A:
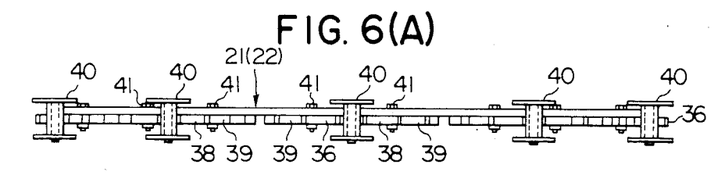
FIG. 6 shows the mounting of the adjusting member, wherein (A) is a front view and (B) is a bottom view of (A), with partial omissions.
Figure 6B:
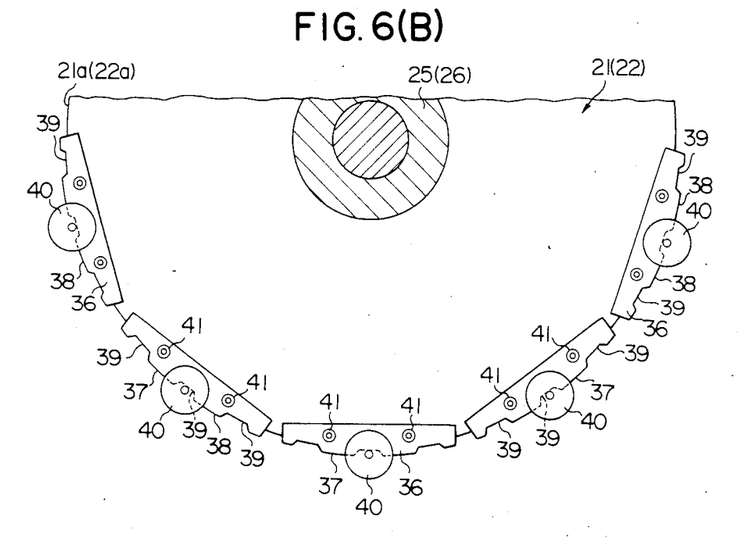

Now the engagement of said first overhead conveyor 3 with the wheel 21 for said defeathering line is described. This engagement is effected for the purpose of rotating said wheel 21 at the same speed as the movement of said first overhead conveyor 3 at the terminal portion 1a of said defeathering line 1. While said first overhead conveyor 3 is moving along the track of rotation of the outer periphery 21a of the wheel 21, the chain 6 of the first overhead conveyor 3 is engaged by the plurality of adjusting members 36 (See FIG. 6) mounted on said outer periphery 21a at equal intervals. As the result of this engagement of the chain 6 with the adjusting members 36, the wheel 21 for said defeathering line is caused to rotate at the same speed as the speed of movement of said first overhead conveyor 3.

For this purpose, said first rail 2 is arranged along the track of rotation of the outer periphery of said wheel 21 for the defeathering line so that the rail adjoins approximately one half of the total circumference of the wheel 21. The portion of said first rail 2 located in such semi-circular area is fixedly mounted on the frame 15 with a suitable bracket 43a. As a result, said defeathering shackle 7 suspended from said first overhead conveyor 3 travels in said semi-circular area with its engaging sections 7a positioned opposite the leg-holding notches 23 of said leg-holding wheel 24 in a vertical plane. During this movement, the bird A suspended from said engaging sections 7a will be caught and held by said leg-holding notches 23 as more fully described later. Thus, said semi-circular area constitutes a leg-engaging operative region 42 where the bird A suspended from said engaging sections 7a is engaged and held by said leg-holding notches 23 in said terminal portion 1a of the defeathering line 1.

Figure 3:
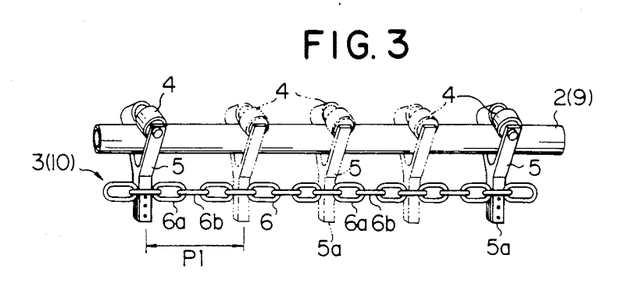
FIG. 3 is a perspective view showing a part of the first and second overhead conveyors.

Said adjusting member 36 is an arcuate plate so configured that when it is mounted on the outer periphery 21a of the wheel 21 for the defeathering line its arcuate peripheral surface 37 disposed outside of said outer periphery 21a has a larger radius of curvature than that of said wheel 21 for the defeathering line. On said peripheral surface 37, portions 38 and recesses 39 are formed for securely engaging said chain 6. Since the chain 6 is composed of numerous joined links with each vertical link 6a coming next to each horizontal link 6b, as shown in FIG. 3, the portion 38 engages the vertical link 6a and the recess 39 engages the horizontal link 6b. Said adjusting member 36 has a rotatable roller 40 at the center of said peripheral surface 37. The rotatable roller 40 projects in the centrifugal direction from said peripheral surface 37. The adjusting member 36 is mounted on said outer periphery 21a with bolts 41 such that the extent of its projection in the centrifugal direction from the wheel 21 can be adjusted. Since numerous adjusting members 36 are mounted along the entire circumference of said wheel 21, the degree of tension of the chain 6 can be varied by adjusting the degree of the projection of each said adjusting member 36.

Said second overhead conveyor 10 is engaged by said wheel 22 for the eviscerating line so as to cause said second overhead conveyor 10 to move at the same speed as the speed of rotation of said wheel 22 for the eviscerating line. (Due to the structure earlier described, this speed is the same as the speed of rotation of the wheel 21 for the defeathering line, and consequently as the speed of movement of said first overhead conveyor 3.) Said second overhead conveyor 10 moves in the same track as the track of rotation of the outer periphery 22a of the wheel 22 for the eviscerating line. During such movement, the chain 6 of the second overhead conveyor 10 is caught and engaged by adjusting members 36 which are mounted along said outer periphery 22a at equal intervals (see FIG. 6). Since the adjusting member 36 is identical in structure with the one described above in connection with the wheel 21 for the defeathering line, a detailed description of the adjusting member 36 for said wheel 22 for the eviscerating line is omitted. Due to this engagement of the chain 6 by adjusting members 36, said second overhead conveyor 10 is enabled to move at the same speed as the speed of rotation of the wheel 22 for the eviscerating line.

For this purpose, said second rail 9 is arranged along said track of rotation and in the semi-circular area adjoining substantially one half of the total circumference of the wheel 22 for the eviscerating line. The second rail 9 arranged in said semi-circular area is fixed on the frame 15 with a suitable bracket 43b. As a result, the eviscerating shackle 11 suspended from the second overhead conveyor 10 travels in said semi-circular area with its engaging sections 11a positioned opposite said pair of leg-holding notches 23 in the centrifugal direction from the leg-holding wheel 24. During the travel, the bird A held in said leg-holding notches 23 is received and engaged by the eviscerating shackle 11 (as hereinafter more fully described).

Thus, at said initial portion 8a of the eviscerating line 8, said semi-circular area constitutes a leg-releasing operative region 44 where the bird A held in said leg-holding notches 23 is released therefrom for engagement with the eviscerating shackle 11.

Thus, as said first overhead conveyor 3 is driven to move, the wheel 21 for the defeathering line is rotated by said chain 6 and synchronously with such rotation, the wheel 22 for the eviscerating line is also rotated. By its chain 6, said second overhead conveyor 10 is caused to move at the same speed as the speed of the movement of said first overhead conveyor 3. At the same time, the leg-holding wheel 24 is rotated synchronously with and at the same speed as the speed of rotation of the wheel 21 for the defeathering line. As a result, the defeathering shackle 7 travels while positioned opposite said leg-holding notches 23 in the leg-engaging operative region 42, and the eviscerating shackle 11 travels while positioned opposite said leg-holding notches 23 in the leg-releasing operative region 44.

Figure 8:
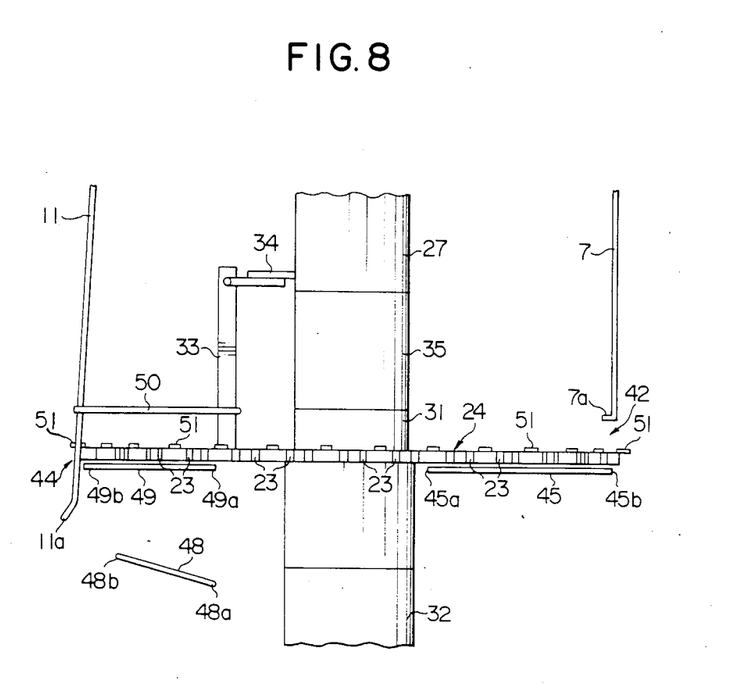
FIG. 8 is a front view of FIG. 7.

As shown in FIG. 7, in the area extending generally from the entrance 42a of said leg-engaging operative region 42 to its mid-portion 42b, a rod-like engaging guide member 45 is provided for guiding and for causing to engage with the leg-holding notches 23 of said leg-holding wheel 24 the legs Ab higher than the knee joints (In drawings, lower than the knee joints since birds are suspended upside down) of the bird A as suspended by its ankles Aa from the engaging sections 7a of the defeathering shackle 7. This engaging guide member 45 is formed such that it engages the legs Ab of the bird A suspended from the defeathering shackle 7 as the shackle 7 travels and while maintaining such engagement gradually guides the legs Ab toward the leg-holding notches 23 positioned opposite said defeathering shackle 7 (namely in the centripetal direction to the center of the leg-holding wheel 24). Said engaging guide member 45 has an arcuate shape such that its forward end 45a is positioned outside the track of rotation of the periphery of the leg-holding wheel 24 in the vicinity of said entrance 42a and its rear end 45b is positioned inside said track of rotation in the vicinity of said mid-portion 42b. In this particular embodiment, the engaging guide member 45 is made of a rod, but it can take any other form suitable to reduce the friction caused by its engagement with the legs Ab. The engaging guide member 45 is fixedly mounted on said frame 15 with a suitable mounting member (not shown) at a position close to the underside of the leg-holding wheel 24 and in parallel with said leg-holding wheel 24 (FIG. 7 and FIG. 8).

Figure 9:
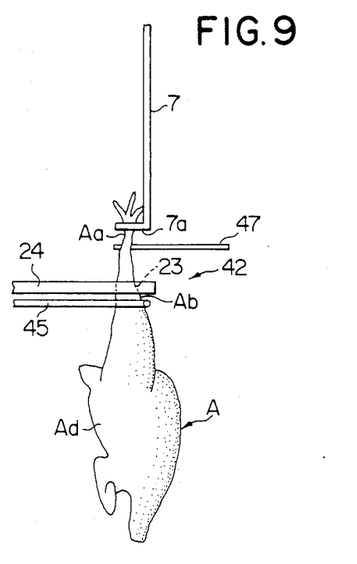
FIG. 9 is an enlarged side view of a part of the leg-engaging, operative region.

Thus, when the traveling defeathering shackle 7 reaches the entrance 42a of the leg-engaging operative region 42, the legs Ab of the bird A suspended from said defeathering shackle 7 are engaged by said engaging guide member 45 and as said defeathering shackle 7 further travels and the leg-holding wheel 24 rotates, said legs Ab engaged by said engaging guide member 45 are gradually guided toward said leg-holding notches 23 positioned opposite said defeathering shackle 7 and eventually completely engage with said leg-holding notches 23 at about the mid-portion 42b of said leg-engaging operative region 42. As a result, the legs Ab of the bird A are engaged and held by said leg-holding notches 23 while said bird A is being suspended from said defeathering shackle 7 by its ankles Aa (FIG. 9).

Figure 1:
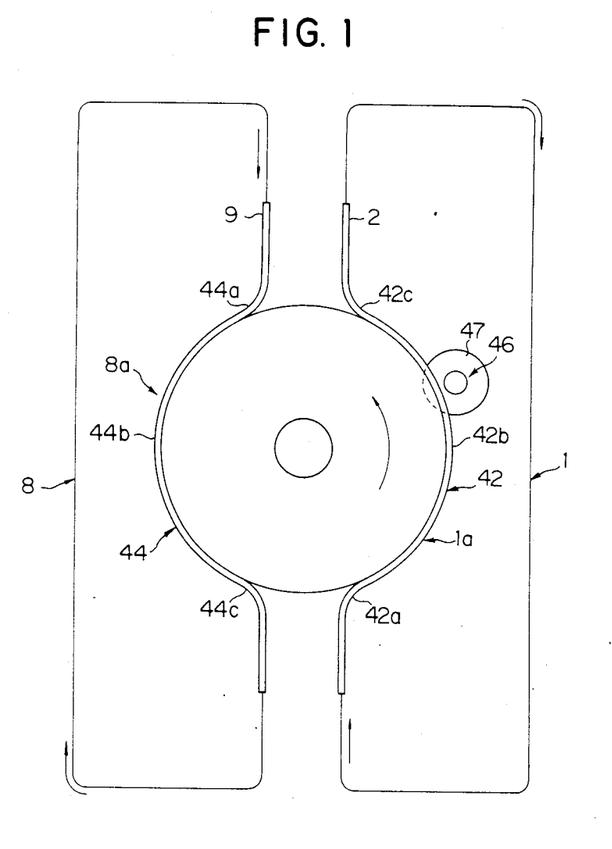
FIG. 1 is a schematic plan view showing a basic embodiment of this invention.
Figure 2:
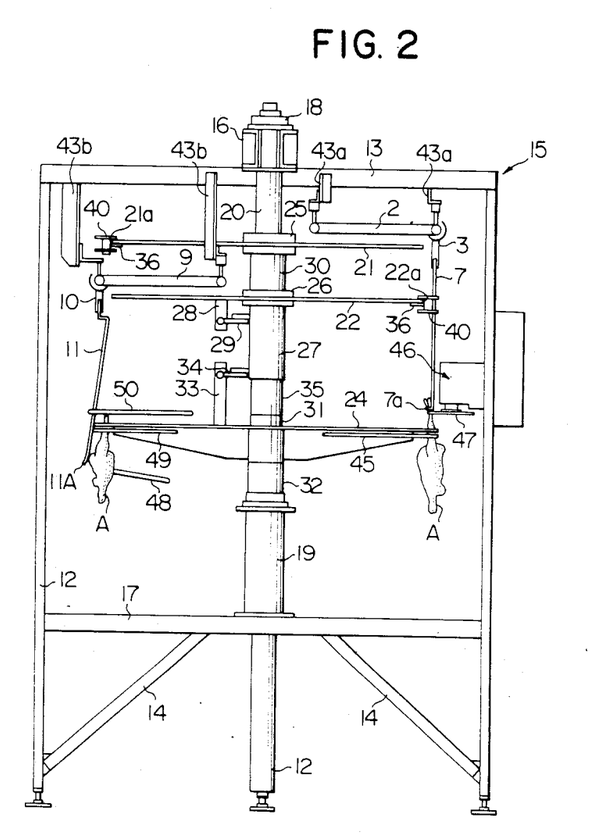
FIG. 2 is a partly omitted front elevational view of the transfer apparatus according to this invention.

As shown in FIGS. 1 and 2, a cutter 46 is provided in the area between the mid-portion 42b of said leg-engaging operative region 42, namely the point where the legs Ab engage said leg-holding notches 23, and its exit 42c, for cutting the ankles Aa of the bird A suspended from said defeathering shackle 7 and held in said leg-holding notches 23, thereby to disengage the bird A from said defeathering shackle 7. The cutter 46 has a rotatable cutting blade 47 and is rigidly mounted on said frame 15 with its blade 47 rotatable in a horizontal plane.

Thus the bird A is released from its engagement with the defeathering shackle 7 as its ankles Aa are cut by said cutter 46 and is held only by the leg-holding wheel 24 at the exit 42c. The bird A is then moved toward the entrance 44a of said leg-releasing operative region 44 while being held only by the leg-holding nothes 23, namely only by the leg-holding wheel 24.

Figure 10:
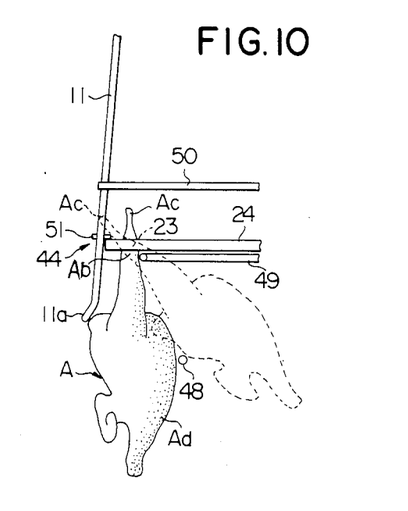
FIG. 10 is an enlarged side view of a part of the leg-releasing operative region.

As shown in FIG. 7, in the semi-circular area between the entrance 44a of said leg-releasing operative region 44 and the mid-portion 44b a rod-like inclining guide member 48 is provided for guiding and inclining the bird A held in said leg-holding notches 23 so that the tips Ac of its legs Ab come closer to the eviscerating shackle 11 positioned opposite said leg-holding notches 23. The inclining guide member 48 engages and supports the body Ad of the bird A held by said leg-holding notches 23 as the leg-holding wheel 24 rotates and, while maintaining such engagement, gradually inclines the bird A with the point of engagement of the legs Ab with the leg-holding notches 23 as the axis of rotation so that at said mid-portion 44b the bird A will assume the largest angle of inclination relative to said leg-holding wheel 24. For this purpose, the inclining guide member 48 is located below said leg-holding wheel 24 and has an arcuate shape so that in the vicinity of said entrance 44a its forward end 48a is positioned in the track of rotation of the outer periphery of said leg-holding wheel 24 and in the vicinity of said mid-portion 44b its rear end 48b is positioned closer to the center of the leg-holding wheel 24. Furthermore, the inclining guide member 48 is disposed in a vertically inclined position rising from about said entrance 44a to about said mid-portion 44b so that its forward end 48a is at a lower position than its rear end 48b and is rigidly mounted on the frame 15 with a suitable support member (now shown). The top dead center of inclination of the rear end 48b of the inclining guide member 48 is set such that the bird A is inclined at about forty-five degrees in relation to said leg-holding wheel 24 at said mid-portion 44b (FIG. 8 and FIG. 10). As the leg-holding wheel 24 rotates, the tips Ac of the legs Ab gradually extend outwardly of the track of rotation of the outer periphery of said leg-holding wheel 24 due to the fact that the body Ad is guided and inclined by said inclining guide member 48. The degree of such extension of the tips Ac becomes maximum at said mid-portion 44b where the legs Ab come within the range of engagement of the engaging sections 11a of the eviscerating shackle 11.

Said inclining guide member 48 may be modified in various ways depending upon a particular embodiment. For example, in order to reinforce the strength to support the bird A, another identical rod-like inclining guide member 48 can be arranged below or above but in parallel with said first inclining guide member. Alternatively, to reduce the friction caused by the engagement with the body Ad as well as to reinforce the strength to support it, there can be provided a belt conveyor or the like which moves at the same speed as the speed of rotation of the leg-holding wheel 24.

As shown in FIG. 7, in the area extending generally from the entrance 44a of the leg-releasing operative region 44 to the mid-portion 44b, a rod-like releasing guide member 49 is provided for guiding the bird A suspended from the leg-holding notches 23 so as to release its legs Ab from said leg-holding notches 23. As said leg-holding wheel 24 rotates the releasing guide member 49 engages the legs Ab retained in the leg-holding notches 23 and, while maintaining such engagement, gradually guides said legs Ab in the direction of engagement with the eviscerating shackle 11 positioned opposite said leg-holding notches 23 (namely in the centripetal direction of said leg-holding wheel 24). Said releasing guide member 49 has an arcuate configuration such that its forward end 49a is positioned inside the track of rotation of the outer periphery of said leg-holding wheel 24 in the vicinity of the entrance 44a and its rear end 49b is positioned substantially on said track of rotation in the vicinity of said mid-portion 44b. Although the releasing guide member 49 is made of a rod in this particular embodiment, it may be made of other suitable material. The releasing guide member 49 is arranged close to the underside of said leg-holding wheel 24 in parallel therewith and is rigidly mounted on said frame 15 with a suitable support body (not shown) (FIG. 7 and FIG. 8). The legs Ab of the bird A are released from said leg-holding notches 23 at said mid-portion 44b and the bird A is dropped into and its legs Ab are received by the engaging sections 11a of the eviscerating shackle 11.

As described above, by the coaction of the inclining guide member 48 and the releasing guide member 49, the bird A as inclined about forty-five degrees with the tips Ac of its legs Ab extending into the engaging range of the engaging section 11a of the eviscerating shackle 11 positioned opposite the leg-holding notches 23 in which the tips Ac were held, is released from said leg-holding notches 23 and dropped into and held by said eviscerating shackle 11 with the legs Ab engaged by the engaging section 11a of the eviscerating shackle 11. A retainer member 50 is provided for preventing the eviscerating shackle 11 from moving in the centrifugal direction from the outer periphery of the leg-holding wheel 24 when the legs Ab are in engagement with the engaging sections 11a of said eviscerating shackle 11. This retainer member 50 also functions to guide said eviscerating shackle 11 traveling in the leg-releasing operative region 44 so that the shackle 11 can travel with its lower part in contact with the outer periphery of said leg-holding wheel 24. The retainer member 50 has an arcuate form corresponding to the arcuate track of said leg-releasing operative region 44 and is disposed along substantailly the entire length of said leg-releasing operative region 44 from the entrance 44a to the exit 44c. The retainer member 50 is rigidly mounted on the frame 15 with a suitable support member (not shown) in parallel with said leg-holding wheel 24. In the embodiment herein described, the retainer member 50 is disposed above the upper surface of said leg-holding wheel 24 (FIG. 2, FIG. 7 and FIG. 8). However it may be disposed below the leg-holding wheel 24 to achieve the same result.

Also a plurality of positioning members 51 are provided on the outer periphery of the leg-holding wheel 24 to prevent the eviscerating shackle 11 from swinging back and forth in its travel path (namely, along the circumferential direction of said leg-holding wheel 24) thereby coming out of alignment with the leg-holding notches 23 during its travel in said leg-releasing operative region 44. Said positioning member 51 is mounted on said outer periphery at the mid- point between the two leg-holding notches 23 of the same pair and the number of such positioning members 51 corresponds to the number of pairs of such leg-holding notches 23. The positioning member 51 is fixedly mounted on the outer periphery of said leg-holding wheel 24 and extends in the centrifugal direction from said outer periphery. The bifurcating portion 11b of the eviscerating shackle 11 is engaged by said positioning member 51 and the swinging motion of the eviscerating shackle 11 along its travel path can thereby be eliminated (FIG. 8 and FIG. 10).

In the embodiment described above, the second overhead conveyor 10 and, consequently, said leg-holding wheel 24 are caused to move synchronously with and at the same speed as the first overhead conveyor 3 by driving the defeathering line 1. However, separate synchronous driving means may be provided to effect such synchronous movement of conveyors.

As detailed above, according to this invention, a rotatable leg-holding wheel which can engage and hold the legs of birds is disposed in close proximity to the terminal portion of the defeathering line where the defeathering operation is terminated and to the initial portion of the eviscerating line where the eviscerating operation is commenced and the transfer of birds is accomplished within the space of rotation of said leg-holding wheel. Thus, not only the space required for the installation of the leg-holding wheel as a transfer means can be minimized thereby enabling the reduction of the overall space required for the entire poultry processing lines but also a most effective arrangement of the entire processing lines can be made in a particular space available.

Furthermore, the releasing of birds from said leg-holding wheel and the engagement of the birds by eviscerating shackles by the coaction of the inclining guide member and the releasing guide member produce such unique effects whereby the structure of the apparatus can be made very simple, its manufacture easy and the transfer operation accurate. A still further advantage of this invention is that due to the fact that no components requiring lubrication are disposed in the area where birds are held, there is no possibility of the birds being contaminated by the lubricant, thereby achieving a highly desirable result from the viewpoint of food sanitation. Finally since the engagement and release of birds are done by said guide members by a gradual application of force and not by a sudden application thereof, the breakage of the skin of the bird or the rupture of its viscera can be completely prevented and thus the problems in the subsequent steps of the process can be effectively precluded.

What is claimed is:

1. In a poultry processing arrangement comprising a defeathering line including a first overhead conveyor having a terminal portion and defeathering shackles secured to said first conveyor for removing the feathers of birds suspended by their ankles from the defeathering shackles mounted on the first overhead conveyor moving in an endless manner and an eviscerating line including a second overhead conveyor having an initial portion and eviscerating shackles secured to said second conveyor for removing the entrails of such birds suspended by their legs from eviscerating shackles mounted on the second overhead conveyor likewise moving in an endless manner, and an apparatus for transferring the defeathered birds from said defeathering shackles onto said eviscerating shackles, the improvement thereon comprising: the apparatus for transferring the birds including a frame, a rotary shaft vertically mounted on the frame, a rotatable leg-holding wheel fixed on the rotary shaft, said wheel having a plurality of equally-spaced, leg-holding notches formed on the outer periphery thereof for holding the legs of the bird, said leg-holding wheel being located in proximity to the terminal portion of said defeathering line and to the initial portion of said eviscerating line, means for engagingly associating the eviscerating and defeathering lines and the leg-holding wheel, so that the leg-holding wheel is rotatably synchronously with and at the same speed as said defeathering line and said eviscerating line, one of said lines driving the leg-holding wheel and the other of said lines, a leg-engaging operative region defined along the area where said leg-holding wheel adjoins said terminal portion of said defeathering line in which said defeathering shackles travel while positioned opposite said leg-holding notches, said leg-engaging operative region having an entrance, an exit and a mid-point therebetween, a leg-releasing operative region defined along the area where said leg-holding wheel adjoins said initial portion of said eviscerating line, in which said eviscerating shackles travel while positioned opposite said leg holding notches, said leg-releasing operative region having an entrance, an exit and a mid-point therebetween, a first curved engaging guide member fixedly mounted on said frame and disposed below the leg-holding wheel so as to extend generally from the entrance of said leg-engaging operative region at a position being located outside the outer periphery of the wheel and being curved extending to the mid-point of said region at a position being located within the outer periphery of the wheel for passively engaging the legs of the bird above the knees thereof when said bird is suspended from the defeathering shackles and for gradually passively engaging and guiding said legs toward and into said leg-holding notches for engagement therewith, wherein the legs of the bird are simultaneously engaged in the defeathering shackles and the notches, a cutter provided forwardly of the point where the legs of the bird are engaged simultaneously by said leg-holding notches and the defeathering shackles in said leg-engaging operative region for cutting the ankles of the bird and for thereby disengaging the bird form said defeathering shackle, an inclining second guide member fixedly mounted on said frame below the leg-holding wheel and disposed so as to extend in the area generally from the entrance of said leg-releasing operative region at a positon being located outside the outer periphery of the wheel and being curved extending to the mid-point of said region at a position being located within the outer periphery of the wheel for passively engaging the body of the bird above the legs thereof, as said poultry enters the leg-releasing operative region being engaged in said leg-holding notches as said leg-holding wheel rotates, the passive engagement between the bird and the second guide member gradually inclining and guiding the bird with its legs engaged in said leg-holding notches so that the tips of said legs are tilted toward said eviscerating shackle, a third releasing guide member fixedly mounted on said frame below the leg-holding wheel and disposed above said inclining second curved guide member extending from the entrance of said leg-releasing operative region at a position being located within the outer periphery of the wheel and being curved extending to the mid-point of said region at a position being located outside the outer periphery of the wheel wherein said third guide member engages the legs of the bird held in said leg-holding notches as said leg-holding wheel rotates and for gradually, passively guiding said legs away from the leg-holding notches for passive disengagement therefrom, said second inclining guide member and said third releasing guide member coacting to release the legs of the bird held in the leg-holding notches, so that the passively released bird will be received and its legs engaged by the eviscerating shackle, said shackle being located below said leg-holding notches, thereby passively transferring the bird from said defeathering line onto said eviscerating line.

* * * * *